United States Patent [19]

Boden

[11] Patent Number: 4,807,333
[45] Date of Patent: Feb. 28, 1989

[54] CORD LOCK WITH CORD REMOVAL SLOT

[76] Inventor: Ogden W. Boden, 1580 Gaywood Dr., Altadena, Calif. 91001

[21] Appl. No.: 128,023

[22] Filed: Dec. 3, 1987

[51] Int. Cl.$^4$ ............................................. F16G 11/04
[52] U.S. Cl. .................................. 24/117; 24/136 R; 403/211
[58] Field of Search .................. 24/117 R, 136 R; 403/211, 390

[56] References Cited

U.S. PATENT DOCUMENTS

| | | | |
|---|---|---|---|
| 671,074 | 4/1901 | White | 403/211 |
| 3,132,390 | 5/1964 | Boden | 24/117 R |
| 3,564,670 | 2/1971 | Bengtsson | 403/390 |
| 3,845,575 | 11/1974 | Boden | 403/211 |
| 3,861,003 | 1/1975 | Boden . | |
| 3,953,144 | 4/1976 | Boden . | |
| 3,965,544 | 6/1976 | Boden . | |
| 4,102,019 | 7/1978 | Boden | 24/136 R |
| 4,156,574 | 5/1979 | Boden . | |
| 4,665,590 | 5/1987 | Udelhofen et al. | 403/211 |

Primary Examiner—Victor N. Sakran
Attorney, Agent, or Firm—William P. Green

[57] ABSTRACT

A cord lock including a body containing a passage through which two cords extend, and a slide received at least partially within the passage and movable relative to the body between a locking position retaining the cords against longitudinal movement and a released position permitting such movement, with the body having a wall defining a side of the passage laterally adjacent one of the cords and containing a slot through which that cord is movable laterally or transversely of its length out of the passage and to the exterior of the body to enable complete detachment of one of the cords from the body when desired.

22 Claims, 3 Drawing Sheets

CORD LOCK WITH CORD REMOVAL SLOT

BACKGROUND OF THE INVENTION

This invention relates to cord lock devices for releasably retaining two cords (which may typically be opposite ends of a single cord) against longitudinal movement, as for instance for retaining a drawstring, shoestring, or the like in a tightened condition.

The devices of the invention are of a known general type including a body containing a passage through which the two cords extend, and a slide located at least partially within the passage and movable relative to the body between a locking position in which it retains both of the cords against longitudinal movement in a predetermined direction, and a released position permitting such movement of the cords. The slide may be located between the two cords and act in the locking condition to wedge the cords in opposite directions against two converging side walls of the passage to effectively grip the cords and positively prevent their longitudinal movement.

One characteristic of most previously proposed cord locks of this type which has limited their use for certain purposes resides in the fact that even in the released or loose condition of the cords both of the cords usually remain attached to the cord lock device, and thus remain attached to one another through that device. This prevents use of these prior devices in situations in which the garment or other item is of a type requiring or rendering desirable complete separation of the cords from one another in the released condition for facilitating removal of the garment from a user, or for other purposes. For example, when the cords being retained are the opposite ends of a shoestring, it is much easier to remove the shoe if the ends of the string can be completely detached from one another. Most prior cord locks permit such detachment of one of the cords from the device only by pulling the cord longitudinally from the passage in the body of the device. Subsequent reattachment of the cord to the device then requires meticulous threading of the cord back through that passage, a procedure which is sufficiently difficult and time consuming to essentially preclude use of such a device for retention of shoestrings.

SUMMARY OF THE INVENTION

The general purpose of the present invention is to provide an improved cord lock which is specially designed for use in situations of the above discussed type in which effective use of the device makes it desirable that one of the cords be completely removable from the locking passage in the cord lock body under some circumstances, and then be easily and quickly reinsertable into that passage when the device is to be used for holding the cords in a tightened condition. A lock embodying the invention does not require longitudinal threading of the cord into or out of the passage in the body, and past the locking slide, and enables very rapid attachment of the cord to the body and detachment from the body with little care or skill required.

To attain this result, the body of the device is so formed that one of the walls defining a side of the passage through which the cords extend contains a slot laterally adjacent one of the cords and through which that cord is movable laterally or transversely of its length between a position within the passage and a position outside of the passage and at the exterior of the body. The cord can be easily pulled laterally through this slot either into or out of the passage, to thus rapidly and easily detach the cord from the body of the cord lock or reattach the cord when desired. The slot preferably has a width slightly less than the normal width or thickness of the cord, to thus effectively retain the cord in the body when the device is in its locking condition, while enabling the cord to be forced laterally from the body and through the slot by exertion of appropriate lateral force on the cord. The slot may increase in width toward one of its ends and preferably both of its ends, to form a throat or throats facilitating movement of the cord into or out of the slot.

The passage in the body may have two opposite side walls which converge toward one another and form a constriction coacting with the slide to lock the cords against longitudinal movement. Preferably, the previously mentioned slot is located near and extends generally along one of these converging walls. For best results, the slot is spaced a short distance from that wall, to leave a narrow shoulder facing inwardly toward the cord adjacent the slot in a manner enabling that shoulder to assist in retention of the cord within the body passage in the locking condition of the device.

BRIEF DESCRIPTION OF THE DRAWINGS

The above and other features and objects of the invention will be better understood from the following detailed description of the typical embodiments illustrated in the accompanying drawings, in which.

Figure 2:
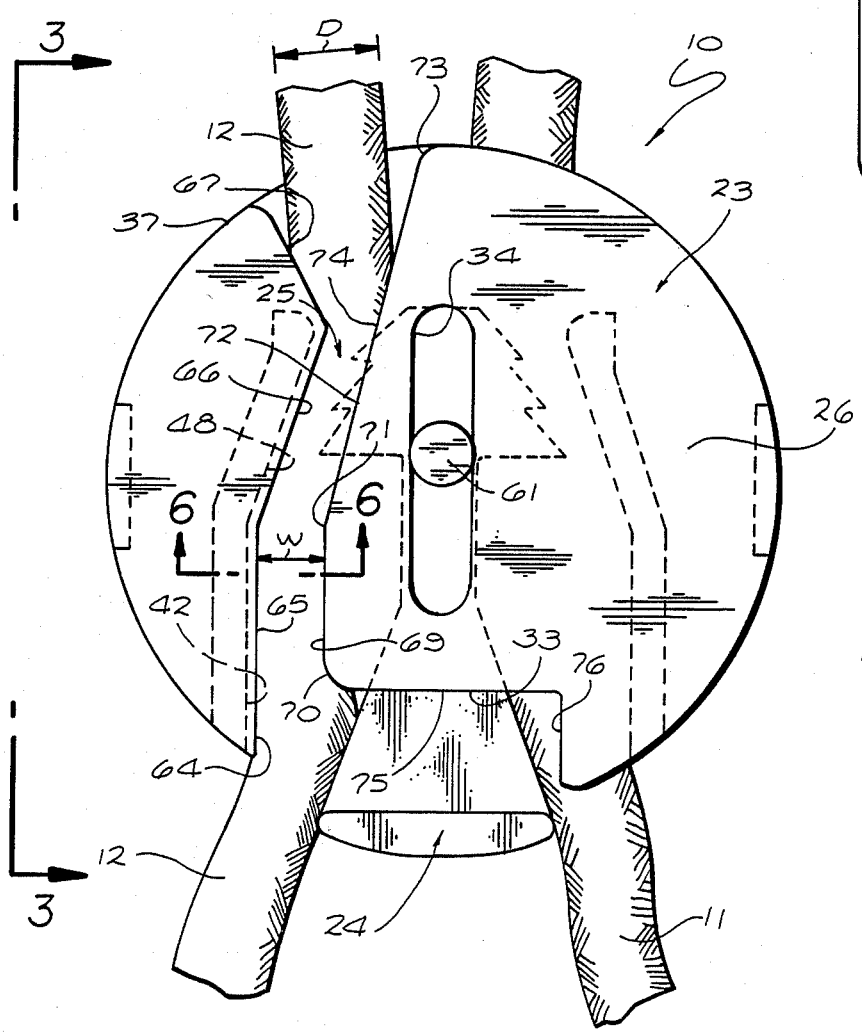
FIG. 2 enlarged elevational view showing the back side of the cord lock device of FIG. 1.
Figure 8:
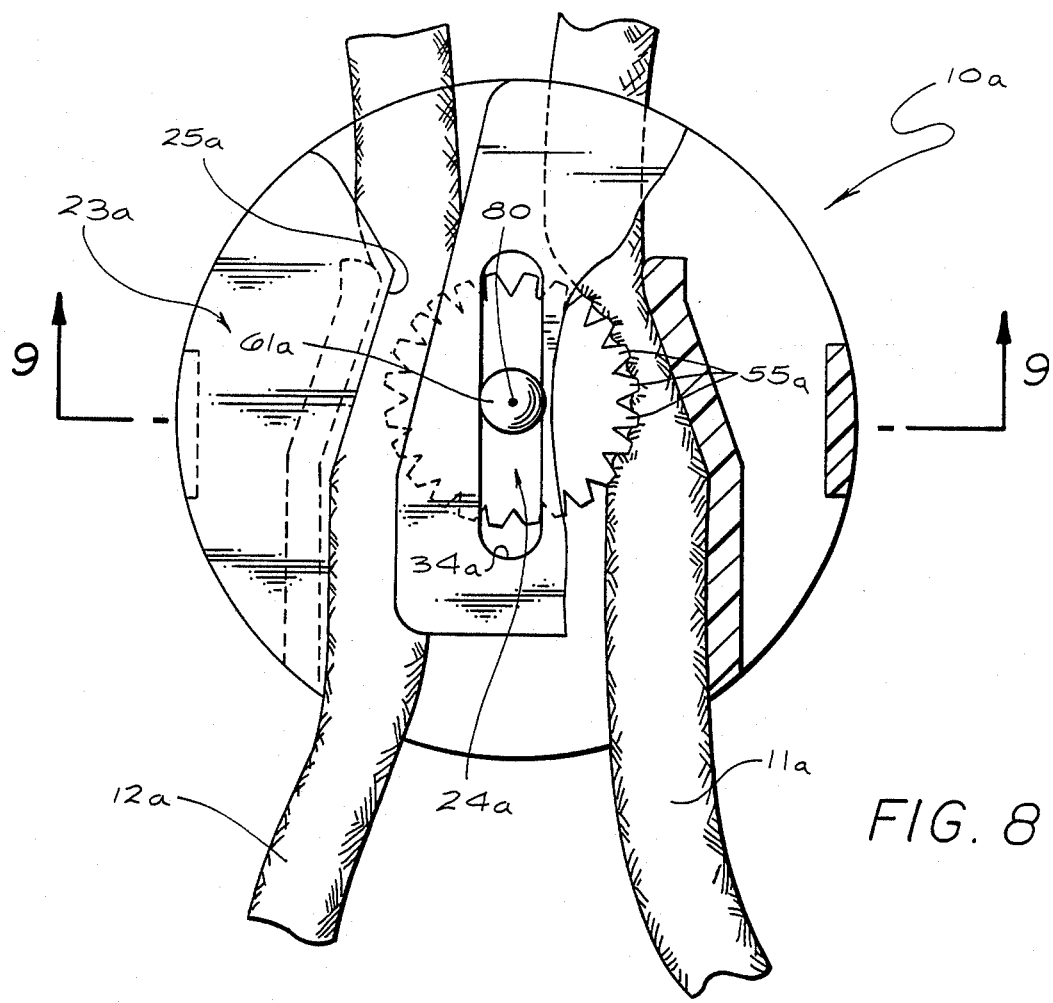
Figure 7:
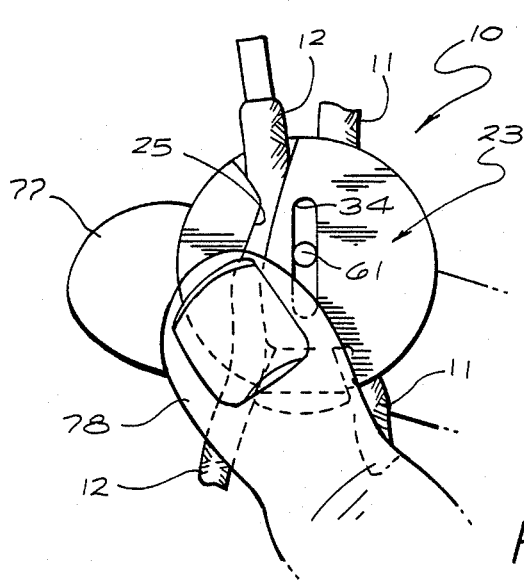

FIG. enlarged fragmentary section taken on line 6—6 of FIG. 2;

FIG. 7 is a somewhat diagrammatic view showing the manner in which one of the cords can be attached to the body of the device;

FIG. 8 is a view similar to FIG. 2 of a variational form of the invention and

Figure 9:
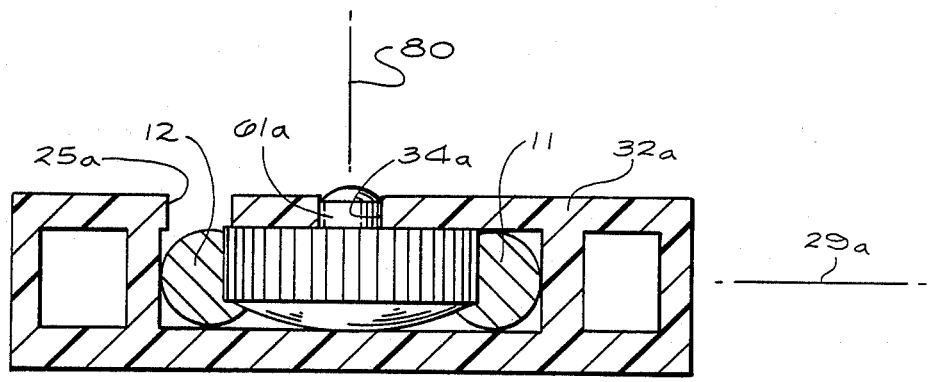

FIG. 9 transverse section taken on line 9—9 of FIG. 8.

DESCRIPTION OF THE PREFERRED EMBODIMENTS

Figure 1:
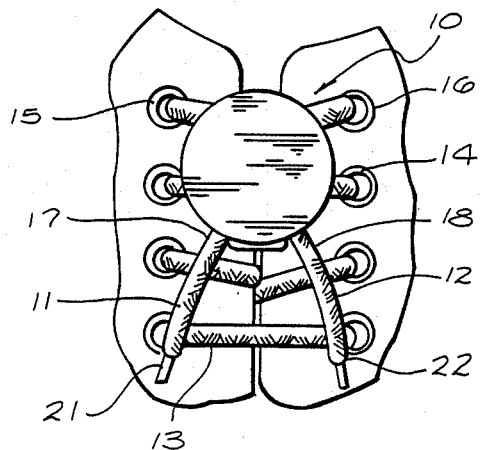
FIG. 1 shows a device embodying the invention as used for retaining the opposite ends of a shoestring in a tightened condition.
Figure 3:
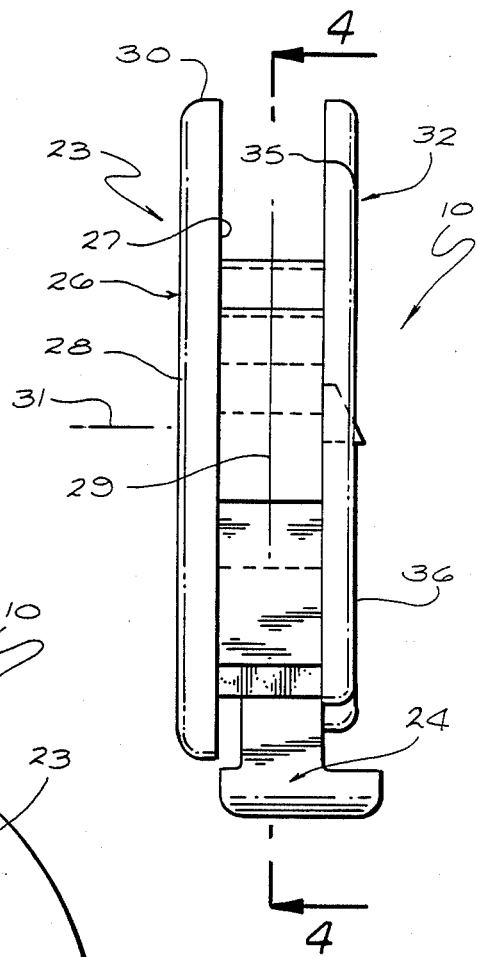
FIG. 3 is a side view of the device taken on line 3—3 of FIG. 2, but the cords or strings to clarify the showing of the parts the cord lock device.

With reference first to FIG. 1, there is illustrated in that figure a cord lock 10 embodying the invention as utilized for retaining the opposite ends 11 and 12 of a shoestring 13 in tightened condition. The device is of course not limited to use in connection with shoestrings, but may be employed in any of numerous different situations in which it is desirable to retain two cords or cord ends against longitudinal movement, particularly where it is helpful to be able to detach one of the cords from the device under some circumstances. For example, a cord lock embodying the invention may be employed for retaining together and tightening the opposite ends of a drawstring at the bottom of a cold weather jacket, to permit the drawstring to be tightened about the wearer in a closed condition but enable the two ends of the drawstring to be completely separated from one another in a released condition to facilitate removal of the jacket from the wearer.

In FIG. 1, the string 13 is laced in conventional manner through the eyelets 14 of the shoe, with the opposite ends of the string extending out through the upper pair of these eyelets at 15 and 16, and then extending downwardly through cord lock 10 and out its lower end at 17 and 18 to the tips 21 and 22 of the string.

As seen in greater detail in FIGS. 2 through 6, the cord lock device 10 includes a circular body 23 containing a passage 123 (FIG. 4) through which the two cords or cord ends 11 and 12 extend vertically generally parallel to one another between the upper and lower ends of body 23. A slide 24 is located within passage 123 in the body between the two cords 11 and 12, and is movable upwardly and downwardly between a locking position such as that shown in FIG. 2 and the released position of FIGS. 4 and 5. Of particular importance to the present invention is the provision of a slot 25 in the back of body 23 allowing movement of cord or cord end 12 transversely of its length into and out of passage 123, to thus permit complete detachment of one of the cords from the body when desired.

Figure 4:
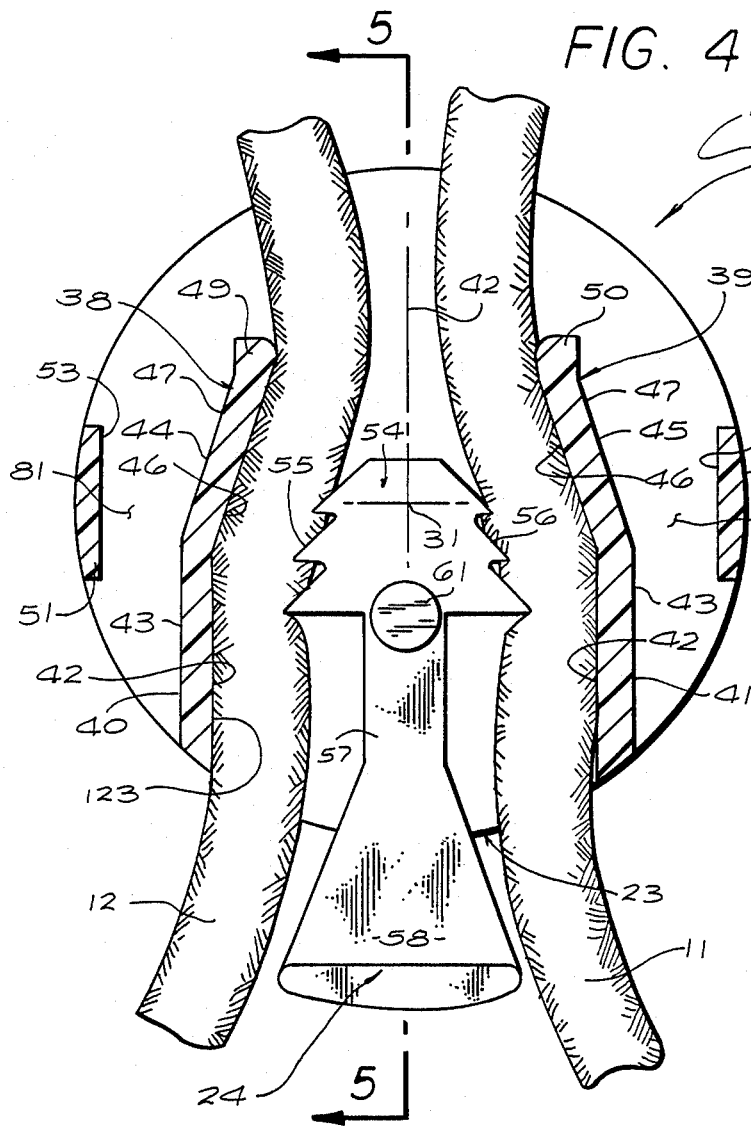
FIG. 4 is a central sectional view taken on line 4—4 of FIG. 3.

Body 23 has a flat circular front wall 26 having surfaces 27 and 28 (FIG. 3) at its opposite sides which are planar and parallel to one another and are parallel to a central plane 29 (the plane in which FIG. 4 is taken). The peripheral edge 30 of wall 26 is circular about an axis 31 extending perpendicular to plane 29. The rear wall 32 of body 23 is generally of a circular configuration similar to front wall 26, except for the provision of slot 25 and an end recess 33 and a second slot 34 in the rear wall. The opposite surfaces 35 and 36 of rear wall 32 are parallel to one another and to surfaces 27 and 28 of the front wall and to the central reference plane 29. The peripheral edge 37 of rear wall 32 is circular about axis 31 except as interrupted by slot 25 and recess 33, and is aligned axially with the peripheral edge 30 of front wall 26.

The cord receiving passage 123 in body 23 is defined by inner surfaces 27 and 35 of the front and rear walls, and by two opposite side walls 38 and 39 extending between the front and rear walls 26 and 32. As seen best in FIG. 4, the walls 38 and 39 preferably have lower portions 40 and 41 which extend parallel to one another and parallel to a central vertical plane 42 containing the central axis 31 of the device. Both the inner surfaces 42 and outer surfaces 43 of portions 40 and 41 of walls 38 and 39 preferably extend parallel to plane 42, and perpendicular to surfaces 27 and 35 of the front and rear walls. At the upper ends of their parallel portions 40 and 41, the walls 38 and 39 have upwardly converging portions 44 and 45, each of which is defined by inner and outer surfaces 46 and 47 extending parallel to one another and perpendicular to plane 29. At the upper extremities of the converging portions 44 and 45 of walls 38 and 39, those walls may have short upper parallel portions 49 and 50 defined by inner and outer surfaces perpendicular to plane 29. Spaced laterally outwardly from the two opposite side walls 38 and 39 of body 23, that body may include two short outer walls 51 and 52 with inner surfaces 53 parallel to one another and spaced from the outer surfaces of walls 38 and 39 to define two passages 81 and 82 which may in some circumstances receive and hold the ends of the shoestring in a manner taught in my prior U.S. Pat. No. 4,102,019 issued Jan. 25, 1978 on "Locking Assemblies Which Maintain Bow Locks In Cords".

Figure 5:
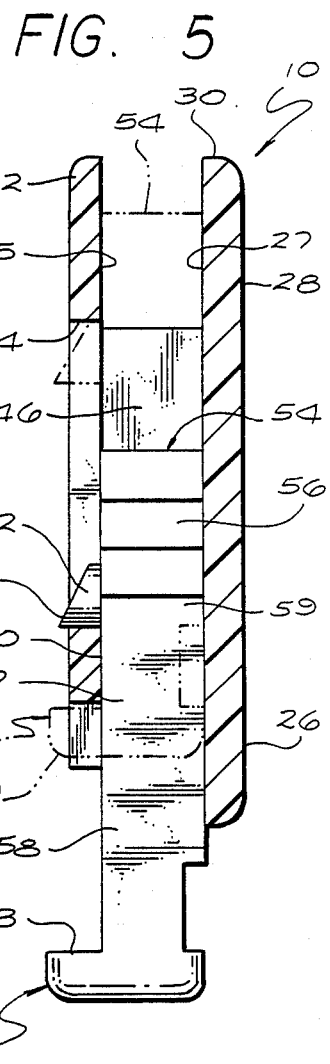
FIG. 5 section taken on line 5—5 of FIG. 4.

Slide 24 may have the outline configuration illustrated in FIG. 4, to provide a head 54 of the slide with two sets of teeth 55 and 56 projecting in opposite directions for engagement with the two cords or cord ends 11 and 12 respectively. Extending downwardly from this gripping portion or head 54, the slide may have a narrower portion 57 connected to a downwardly widening portion 58 of the slide which projects downwardly beyond body 23 to serve as an actuating handle by which a person can move the slide upwardly and downwardly between its locking and released positions. The slide is of a thickness in the direction of axis 31 to be confined closely between the front and rear walls 26 and 32 of body 23, and thus locate the slide for only limited movement relative to the body More particularly, as seen in FIG. 5, the slide has two parallel surfaces 59 and 60 facing in opposite directions and received closely adjacent the inner surfaces 27 and 35 respectively of walls 26 and 32, to guide the slide for upward and downward sliding movement A circular lug 61 projects from slide 24 into elongated slot 34 which extends vertically as viewed in FIG. 2 essentially parallel to the two cords 11 and 12. Lug 61 thus guides the slide for its upward and downward movement between walls 38 and 39, and limits that movement Upon initial assembly of the parts, the slide is forced upwardly between walls 26 and 32 of the body, with an inclined camming surface 62 on lug 61 engaging the inner surface 35 of wall 32 to cam that wall away from wall 26 until lug 61 reaches slot 34. Body 23 is formed of a stiff resilient material enabling such deformation during assembly but capable of automatically returning by its own resilience to the illustrated configuration after the lug 61 reaches slot 34, to thereafter maintain the parts in assembled condition. For this purpose, both the body 23 and slide 24 are preferably formed of an appropriate resinous plastic material, such as nylon, having sufficient rigidity and strength to maintain its illustrated configuration after the parts have been assembled, but capable of enough resilient deformation during assembly to permit the slide to be inserted into the body. At its lower end, slide 24 may have a flange 63 accessible to a user at the outside of the body to permit the user to easily grasp the slide and pull it downwardly relative to the body.

The slot 25 through which one of the cords is insertable laterally into the body or removable laterally from the body preferably has a width W along most of its length which is slightly less than the normal diameter D of the cord 12 which is to be moved through the slot. The cord may be of conventional woven material which normally assumes a predetermined size and diameter, but which is deformable to a constricted condition and will then resiliently return to its normal condition at the diameter D when released. The cord must thus be forced through the narrower slot 25 for detachment from the body or reattachment thereto, but when in the body will tend to assume a larger diameter resisting unwanted displacement of the cord through the slot.

Figure 6:
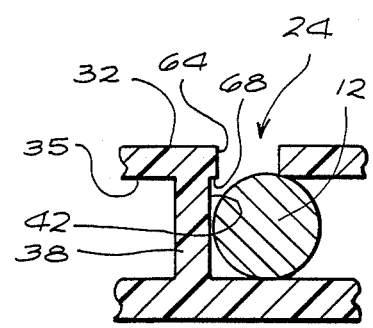

To describe the preferred shape of the slot in greater detail, the slot as viewed in FIG. 2 may have a left edge 64 which is closely adjacent and essentially follows the inner surface of wall 38 of the body, and which more particularly first extends vertically at 65 closely adjacent but spaced slightly to the right of the inner surface 42 of vertical portion 40 of wall 38, and then extends angularly at 66 closely adjacent and spaced slightly to the right of inner surface 48 of the inclined portion 44 of wall 38. At the upper end of this angular portion 66 of edge 64, that edge may have a portion 67 which advances leftwardly as it extends upwardly to the circular edge 37 of wall 32. As seen in FIG. 6, the positioning of edge 64 of slot 25 slightly to the right of a position of alignment with the inner surfaces 42 and 48 of body wall 38 results in the provision of a narrow shoulder 68 in the body constituting a part of surface 35 of wall 32, which shoulder is engageable with a corresponding one of the cords or cord ends 12 to assist in locking it in the body and preventing unwanted movement of the cord outwardly through the slot.

The right side of the slot as viewed in FIG. 2 is defined by an edge 69 of the slot which extends upwardly essentially parallel to portion 65 of edge 64 from a location 70 to a location 71, and then extends angularly at 72 from the location 71 to a location 73 at the periphery of the body. Between the location 71 and a point 74, edges 64 and 69 may converge slightly relative to one another as seen. Upwardly beyond the point 74, the two edges of the slot flare apart to define a throat facilitating movement of the cord into and out of the slot. Beneath the lower extremity 70 of the right hand edge 69 of the slot, that edge may extend first rightwardly at 75 and then downwardly at 76 to define the previously mentioned enlarged recess or lower end of the slot typically having the generally rectangular configuration illustrated in FIG. 2. This recess 33 allows room for movement of the actuating flange 63 of slide 24 upwardly beyond the circular periphery of the body, and to a position such as that illustrated in broken lines at 63' in FIG. 5. The rectangular recess 33 also functions as an enlarged lower portion of the slot, forming a lower enlarged throat corresponding to the upper throat for facilitating insertion of the cord into and out of the slot.

To now describe the manner of use of the cord lock of FIGS. 1 through 7, assume that the device has been connected to the opposite ends of a showstring in the manner illustrated in FIG. 1, with the two string ends or cords extending downwardly through passage 123 at opposite sides of slide 24 in the body. In order to tighten the two cord ends, a user holds the body 23 of the cord lock in one hand and then pulls downwardly on the cords or strings at 17 and 18. When the cord ends are tight enough, the user may push slide 24 upwardly from its FIG. 4 full line position to its FIG. 2 position, to move the gripping head 54 of the slide upwardly between the converging portions 44 and 45 of the opposite side walls 38 and 39 of the body. The dimensioning of the parts is such that such upward movement of the slide causes teeth 55 and 56 to be forced laterally against and into the two cords to tightly clamp them between the teeth and the upwardly converging inner surfaces of portions 44 and 45 of walls 38 and 39, to thus effectively lock the cords against upward movement and maintain the shoestring in tightened condition. In many instances, this locking action can be attained without manual upward displacement of the slide, since the engagement of the teeth with the cords will automatically displace the slide upwardly to its locking condition as a result of the upward force exerted by the cords themselves. When it is desired to loosen the string for removal of the shoe, the user merely pulls the slide 24 downwardly by engagement with its exposed flange 63, so that in the FIG. 4 released condition the teeth are sufficiently retracted relative to the cords to permit upward longitudinal movement of the cords within passage 123 and to a loosened condition.

After the slide has been released, and the cords have been drawn upwardly within passage 123, the left hand cord or cord end 12 of FIGS. 2 and 4 may be completely detached from body 23 and the other cord end by pulling cord end 12 transversely of its length through slot 25 to the exterior of the body. This permits complete loosening of the string in the shoe to any extent desired, and may enable use of a much shorter string than would be necessary if such detachment of the cord ends from one another could not be attained. When it is again desired to tighten the string on the shoe, the cord end 12 is forced transversely of its length back through slot 25 and into the interior of the body to the position represented in FIGS. 2 and 4.

FIG. 7 illustrates somewhat diagrammatically one way that the cord end 12 can be forced into the body through slot 25. As seen in that figure, the body 23 of the device may be held between the user's forefinger 77 and thumb 78, with the thumb holding a part of the cord 12 in one of the enlarged ends of slot 25. The user can then with his other hand grasp the upper end of the cord and pull it sharply inwardly to force the cord into the slot. Removal of the cord from the slot can be attained in a reverse manner, by holding the lower portion of the device as seen in FIG. 7 and then snapping the upper end of the cord with an abrupt motion out of the slot.

FIGS. 8 and 9 show a variational form of cord lock 10a embodying the invention, including a body 23a which may be essentially the same as body 23 of the first form of the invention but which contains a locking element 24a different from the slide 24 of the first form of the invention. The locking element 24a of FIGS. 8 and 9 takes the form of a circular toothed roller having peripheral teeth 55a which extend circularly about an axis 80 which is perpendicular to a central plane 29a of the device corresponding to plane 29 of the first form of the invention. Lug 61a corresponding to lug 61 of the first form of the invention projects upwardly through slot 34a, to be guided for movement longitudinally thereof between an upper locking position of clamping engagement with the cords 11a and 12a and a lower released position. Lug 61a projects upwardly beyond wall 32a of the body, as seen in FIG. 9, to allow manual actuation of the locking element between its active and released positions. By virtue of its circular toothed formation, the locking element 24a can turn about axis 80 if one of the cords is pulled harder or farther than the other, and thus accommodate itself to relative displacement of the cords while still maintaining them in locked condition. As in the first form of the invention, the body 23a contains a slot 25a enabling one of the cords to be pulled transversely of its length between the interior of the body and its exterior, to thus enable complete detachment of that cord from the body and from the other cord when desired.

While certain specific embodiments of the present invention have been disclosed as typical, the invention is of course not limited to these particular forms, but rather ia applicable broadly to all such variations as fall within the scope of the appended claims.

I claim:
1. A cord lock comprising:
 a body containing a passage through which two cords can extend; and
 a locking element located at least partially within said passage and movable relative to said body between a locking position in which it retains said cords against longitudinal movement in a predetermined direction and a released position permitting such longitudinal movement;

said body having first and second walls which are spaced apart and which define two opposite sides of said passage, with said locking element received and confined between said first and second walls;

said first wall containing a slot which is laterally adjacent one of said cords and through which said one cord is movable transversely of its length between a position within the passage and a position outside of said passage and at the exterior of said body.

2. A cord lock as recited in claim 1, in which said body and said locking element define together two paths along which said two cords extend at opposite sides of the locking element, and said slot extends between one of said paths at one of said sides of the element and the exterior of said body.

3. A cord lock as recited in claim 1, which is designed for use with cords of predetermined size, said slot in said first wall having a portion slightly narrower than said one of the cords to resist movement thereof through the slot.

4. A cord lock as recited in claim 1, in which said slot increases in width toward one of its ends.

5. A cord lock as recited in claim 1, in which said slot has a narrow central portion and increases in width at its opposite ends.

6. A cord lock as recited in claim 1, in which said slot has a widened portion at one end thereof, and said locking element has a portion receivable within said widened portion of the slot in said locking position of the element.

7. A cord lock as recited in claim 1, in which said body has two additional walls at opposite sides of said locking element with portions which converge toward one another to form a restricted portion of the passage, and against which said locking element clamps said two cords respectively, said slot being formed in said first wall near one of said additional walls.

8. A cord lock as recited in claim 1, in which said body has two additional walls which extend between said first and second walls at opposite sides of the locking element and which have portions converging toward one another to form a restricted portion of said passage, and against which said element clamps said two cords respectively; said slot being formed in said first wall at a location near and extending essentially along one of said additional walls.

9. A cord lock as recited in claim 8, which is designed for use with cords of predetermined size, said slot having a central portion slightly narrower than said one cord to resist movement thereof through the slot, and said slot having opposite ends which are wider than said central portion.

10. A cord lock as recited in claim 9, in which said slot is spaced a short distance from said one of said additional walls, with a narrow shoulder extending between said one of the additional walls and said slot and facing inwardly toward said one cord to assist in holding said one cord in said passage.

11. A cord lock as recited in claim 7, in which said slot is spaced a short distance from said one of said additional walls, with a narrow shoulder extending between said one of the additional walls and said slot and facing inwardly toward said one cord to assist in holding said one cord in said passage.

12. The combination comprising:
a body containing a passage;
two cords extending through said passage; and
a locking element located at least partially within said said body having first and second walls which are spaced apart and which define two opposite sides of said passage, with said locking element received and confined between said first and second walls;

said first wall containing a slot which is laterally adjacent one of said cords and through which said one cord is movable transversely of its length between a position within the passage and a position outside of said passage and at the exterior of said body.

13. The combination as recited in claim 12, in which said body and said locking element define together two paths along which said two cords extend at opposite sides of said element, and said slot extends between one of said paths at one of said sides of the locking element and the exterior of said body.

14. The combination as recited in claim 12, in which said slot in said first wall has a portion slightly narrower than said one cord to resist movement of the cord therethrough.

15. The combination as recited in claim 12, in which said slot has a portion narrower than said cord, and has a portion at one of its ends wider than said one cord.

16. The combination as recited in claim 12, in which said slot has a narrow central portion and increases in width at its opposite ends.

17. The combination as recited in claim 12, in which said slot has a widened portion at one end thereof, and said locking element has a portion receivable within said widened portion of the slot in said locking position of said element.

18. The combination as recited in claim 12, in which said body has two additional walls at opposite sides of said locking element with portions which converge toward one another to form a restricted portion of the passage, and against which said element clamps said two cords respectively, said slot being formed in said first wall near one of said additional walls.

19. The combination as recited in claim 18, in which said slot is spaced a short distance from said one of said additional walls, with a narrow shoulder extending between said one of the additional walls and said slot and facing inwardly toward said one cord to assist in holding said one cord in said passage.

20. The combination as recited in claim 12, in which said body has two additional walls which extend between said first and second walls at opposite sides of said locking element and which have portions converging toward one another to form a restricted portion of said passage, and against which said element clamps said two cords respectively; said slot being formed in said first wall at a location near and extending essentially along one of said additional walls.

21. The combination as recited in claim 20, in which said slot has a central portion slightly narrower than said one cord to resist movement thereof through the slot, and said slot has opposite ends which are wider than said central portion.

22. The combination as recited in claim 20, in which said slot is spaced a short distance from said one of said additional walls, with a narrow shoulder extending between said one of the additional walls and said slot and facing inwardly toward said one cord to assist in holding said one cord in said passage.

* * * * *